US 6,529,601 B1

(12) United States Patent
Townsend (10) Patent No.: US 6,529,601 B1
(45) Date of Patent: Mar. 4, 2003

(54) METHOD AND APPARATUS FOR POLARIZATION-INSENSITIVE QUANTUM CRYPTOGRAPHY

(75) Inventor: Paul D. Townsend, Ipswich (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/029,614

(22) PCT Filed: May 19, 1997

(86) PCT No.: PCT/GB97/01369

§ 371 (c)(1),
(2), (4) Date: Mar. 5, 1998

(87) PCT Pub. No.: WO97/44936

PCT Pub. Date: Nov. 27, 1997

(30) Foreign Application Priority Data

May 22, 1996 (EP) ............................................. 96303663

(51) Int. Cl.[7] .............................. H04L 9/00; G02B 26/08
(52) U.S. Cl. ........................ 380/256; 380/277; 380/278; 359/229
(58) Field of Search ..................... 380/41, 256, 38, 380/257, 35, 278; 359/175, 229, 233, 238, 325; 385/1, 3

(56) References Cited

U.S. PATENT DOCUMENTS

| | | | | | |
|---|---|---|---|---|---|
| 5,307,410 A | * | 4/1994 | Bennett | ....................... | 380/21 |
| 5,311,592 A | * | 5/1994 | Udd | .............................. | 380/9 |
| 5,764,765 A | * | 6/1998 | Phoenix et al. | ................ | 380/21 |

FOREIGN PATENT DOCUMENTS

WO    WO 96/06491    * 2/1996    ............. H04L/9/08

OTHER PUBLICATIONS

Philosophical Transactions of the Royal Society London, Series A (Mathematical, Physical and Engineering Sciences), Mar. 15, 1996, R. Soc, UK, vol. 354, No. 1708, ISSN 0962–8428, pp. 805–817, XP000605904 Townsend P D et al: "Secure optical communications systems using quantum cryptography" cited in the application see p. 808, line 17–line 39, see p. 814, line 25–line 34, see figure 1.

Optics Letters, Aug. 15, 1995, USA, vol. 20, No. 16, ISSN 0145–9592, pp. 1695–1697, XP000520877 Marand C et al: "Quantum key distribution over distances as long as 30 km" cited in the application see p. 1695, right–hand column, line 16–p. 1696, left–hand column, line 28.

Electronics Letters, Oct. 27, 1994, UK, vol. 30, No. 22, ISSN 0013–5194, pp. 1875–1877, XP000479775 Townsend P D et al: Design of quantum cryptography systems for passive optical networks: see p. 1875, right–hand column, line 1–line 27 see figures 1,2.

* cited by examiner

Primary Examiner—Gilberto Barron
Assistant Examiner—Kambiz Zand
(74) Attorney, Agent, or Firm—Nixon & Vanderhye P.C.

(57) ABSTRACT

A communication system uses quantum cryptography for the secure distribution of a key. A single-photon signal is phase-modulated and transmitted over a pair of time-multiplexed transmission paths. With each original single-photon signal in a given one of the transmission paths, a duplicate signal is transmitted. The duplicate is identically modulated and orthogonally polarized. At the receiver, the outputs of the two paths are combined interferometrically. A single polarization-insensitive measurement is derived from the combined contributions of the orthogonally polarized signals.

24 Claims, 10 Drawing Sheets

METHOD AND APPARATUS FOR POLARIZATION-INSENSITIVE QUANTUM CRYPTOGRAPHY

BACKGROUND OF THE INVENTION

1. Field of the Invention

The present invention relates to a system for the secure communication of data. In particular it relates to the technique known as quantum cryptography. This is a technique suitable for use, for example, over an optical fibre LAN, or in an access network or a broadband optical telecommunications system.

2. Related Art

In quantum cryptography, data is encoded at the transmitter and decoded at the receiver using some specified algorithm which is assumed to be freely available to all users of the system, whether authorised or otherwise. The security of the system depends upon the key to the algorithm being available only to the authorised users. To this end, the key is distributed over a secure quantum channel, that is a channel carried by single-photon signals and exhibiting non-classical behaviour, as further discussed below. The transmitter and the receiver then communicate over a separate channel, known as the public channel, to compare the transmitted and received data. The presence of any eavesdropper intercepting the transmitted key results in a change in the statistics of the received data, and this change can be detected. Accordingly, in the absence of any such change in the statistics of the data, the key is known to be secure. The secret key thus established is then used in the encryption and decryption of subsequent communications between the transmitter and receiver. For added security, the existing key may periodically be replaced by a newly generated key.

In recent years considerable work has been directed to developing practical applications of quantum cryptographic techniques. For example, the present applicant's earlier International Application published as WO95/07582 discloses and claims a variety of multiple access networks using quantum cryptography for key distribution. As described in that application, the single-photon signals may be encoded using polarisation modulation, or using phase modulation. In the case of phase modulation, the preferred approach is to use a Mach-Zender configuration, in which a differential modulation is applied across a pair of transmission paths, and the outputs of the paths are combined interferometrically at the demodulator/detector. In practice only a single physical link is available between the transmitter and receiver, and so the two paths are time-multiplexed across the link by applying a delay to the signal corresponding to one of the transmission paths. This technique is described further in the paper by P. D. Townsend et al., "Secure optical communications systems using quantum cryptography", Phil. Trans. R. Soc. Lond. A (1996) 354 805–817.

All quantum cryptography systems proposed or implemented to date, are inherently polarisation-sensitive. For laboratory-bench systems over relatively short links this is not a problem. However when it comes to practical implementations of the technology, using fibre links which may be 30 km or longer, then the polarisation sensitivity of the system presents considerable difficulties. Although optical signals may be injected into the link in a defined polarisation state, in passing through the link they are likely to undergo random changes in polarisation as a result of time varying temperature stress-induced birefringence, or other environmental factors. Since the receiver at the other end of the link is polarisation-sensitive, it has been necessary hitherto either to use active polarisation control to maintain a fixed polarisation state at the input to the receiver, or alternatively to substitute polarisation preserving optical fibre for standard optical fibre throughout the system. Either of these measures adds undesirably to the cost and/or complexity of the system.

SUMMARY OF THE INVENTION

According to a first aspect of the present invention, there is provided a method of communication using quantum cryptography comprising:

a) phase-modulating a single-photon signal;

b) transmitting the single-photon signal over a pair of time-multiplexed transmission paths;

c) transmitting with the original single-photon signal in each of the pair of time-multiplexed transmission paths a duplicate single-photon signal, which duplicate single-photon signal is modulated identically to the respective original single-photon signal and is polarised orthogonally with respect to the respective original single-photon signal;

d) combining interferometrically outputs of the time-multiplexed paths including contributions from both the original and the duplicate single-photon signals, and making thereby a polarisation-insensitive measurement.

The present invention provides for the first time a method of quantum cryptography which is inherently insensitive to variations in polarisation over the transmission link. This is achieved by transmitting over each of the time multiplexed transmission paths a pair of equally phase-modulated and orthogonally polarised pulses separated in the time domain, termed herein the "original" and "duplicate" pulses. These may be produced by replicating pulses from a single source, but the invention also encompasses implementations in which the "original" and "duplicate" pulses are derived from independent and possibly mutually incoherent sources. When the pair of pulses is resolved to provide a single measurement at the detector, the effects of any polarisation change on one of the pulses are compensated for by a complementary change in the contribution from the other of the pulses. This mechanism is described in further detail below. The invention makes possible the use of quantum cryptography without requiring polarisation preserving fibre for the transmission link or active polarisation control, whilst providing a bit error ratio across the link that remains generally stable and independent of environmental stresses. Accordingly, the invention makes possible a robust cost-effective and practical system using quantum cryptography to provide enhanced security.

Preferably the method includes a step of splitting the single-photon signal into two orthogonally polarised components subsequent to the step of phase modulating the single-photon signal, and selectively delaying one of the two components, thereby providing the separation in the time domain between the original and duplicate single-photon signals. A particularly efficient method of carrying out this step is by passing the single-photon signal through a length of polarisation maintaining fibre. If the fibre has its axis at 45 degrees to the plane of polarisation of the signal, then it will separate the signal into two orthogonally polarised components of equal amplitude which separate in time as they propagate through the PM fibre. Other techniques for producing the duplicate pulses are possible. For example, the duplicate signal may be taken from the unused second output port of the coupler on the output side of the transmitter.

Preferably, the separation in the time domain of the original and duplicate signals is less than the response time of a single-photon detector used in the step of demodulating and detecting the single-photon signal. When this is the case, then the detector will integrate the contributions from the two polarisation components without there being any further penalty in the signal-to-noise ratio.

Preferably the phase-modulated single-photon signals are output onto a multiple access network, and the step of demodulating and detecting is carried out for each of a plurality of users connected to the multiple access network.

With conventional techniques, the problems of polarisation control become particularly great in the context of multiple access systems where each of a number of receivers would require its own polarisation control system. Each of the receivers then has to go through an initialisation procedure to set the polarisation state appropriately at the outset, and has to maintain the polarisation state throughout the transmission on the quantum channel. Accordingly, the use of a system embodying the present invention is particularly advantageous in this context.

According to a second aspect of the present invention, there is provided a communications system using quantum cryptography comprising:

a) a source of single-photon signals;
b) a phase modulator for modulating the single-photon signals;
c) a pair of time-multiplexed transmission paths connecting the output of the phase modulator to a receiver;
d) means for transmitting with each original single photon signal in each respective time-multiplexed path a duplicate single photon signal which is separated in the time domain from the respective original single-photon signal, the duplicate single-photon signal being modulated identically to the original single photon signal and polarised orthogonally to the original single-photon signal; and
e) a demodulation and detection stage arranged to combine interferometrically outputs of the time-multiplexed transmission paths including contributions from both the original and duplicate single-photon signals to make a single polarisation-insensitive measurement.

According to a third aspect of the present invention, there is provided a signal for use in a quantum cryptographic communication system, the signal comprising original and duplicate single-photon signals which are separated from each other in the time domain, are identically modulated, and are mutually orthogonally polarised.

The invention also encompasses transmitter systems, and methods of operating transmitter systems, and receivers and methods of operating receivers.

BRIEF DESCRIPTION OF THE DRAWINGS

Systems embodying the present invention will be described in further detail by way of example only, and will be contrasted with the prior art, with reference to the accompanying drawings, in which.

DETAILED DESCRIPTION OF EXEMPLARY EMBODIMENTS

Figure 1:
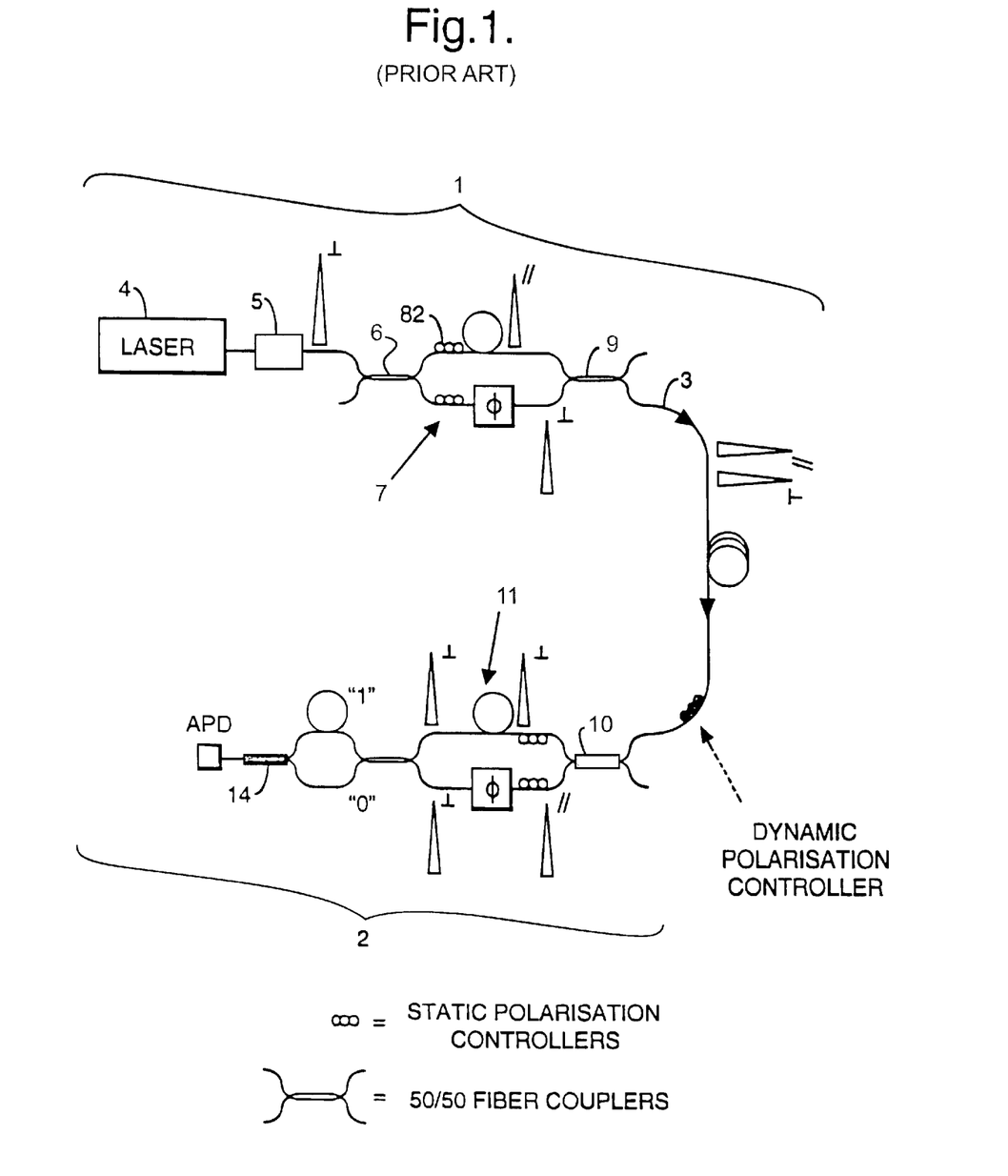
FIG. 1 is a schematic of a prior art communications system using quantum cryptography.

As shown in FIG. 1, a conventional quantum cryptography system using a Mach-Zender configuration comprises a transmitter 1 and a receiver 2 linked by a transmission fibre 3. The transmitter 1 includes a single-photon source, which in this example is provided by a laser 4 and attenuator 5. Pulsed optical signals output by the laser 4 are attenuated by the attenuator 5 so that in each time slot there is in general no more than one, and on average significantly less than one photon. Alternatively, single-photon pulses might be obtained from a parametric amplifier source. Both types of source produce pulses exhibiting the required quantum properties, and the term "single-photon pulse" as used herein denotes all such pulses irrespective of how they are produced.

The single-photon pulses from the attenuated laser pass first through a 50/50 fibre coupler 6 which splits the pulse between the two arms of a modulator section 7. One arm of the modulator section includes a phase modulator preceded by a polarisation controller. The latter is required if, as is typically the case, the modulator is polarisation-dependent. The other arm incorporates a short fibre loop to provide a time delay with respect to the first arm. This other arm also includes a polarisation controller 82 which is used to set light in that arm to a polarisation state orthogonal to that of the first arm. The two arms of the modulator sections are then coupled to the transmission fibre by a second 50/50 fibre coupler 9.

At the receiver, a structure generally complementary to that of the transmitter is used. At the input to the receiver, a polarisation splitter 10 couples signals from the transmission fibre to the two arms of the receiver modulator section 11. This includes, as in the transmitter, a polarisation controller and phase modulator pair in the arm which receives signals polarised in the reference plane, and a delay loop and a further polarisation controller in the other arm. The delay loop is equal in magnitude to the delay loop in the transmitter, and aligns in time the pulses from the two arms of the transmitter. At the same time, the polarisation controllers bring the signals in the two arms of the receiver into the same polarisation state. The signals from the two arms are then combined in a 50/50 coupler and interfere constructively or destructively depending upon the applied phase modulations. In the ideal case where the pulses have maintained their polarisation state over the transmission link this interference will be substantially complete (i.e. fringe visibility close to unity). The signal is output from one or other of the two output ports of the fibre coupler 14. Individual detectors may be provided for each output port, but conveniently, as in this example, a single avalanche photodiode may be used as the photo detector, with the two output branches separated in the time-domain using a further short delay loop.

The conventional system described above is inherently polarisation sensitive. In the receiver, the polarisation splitter divides signals between the two arms of the receiver according to their polarisation state, and applies a delay only in the branch receiving the leading pulses which were polarised in the direction orthogonal to the reference plane. If however the pulses experience a drift in polarisation state over the course of transmission through the link between the transmitter and the fibre, then a component of the leading pulse from the transmitter will enter the lower arm of the receiver, that is the arm without the delay loop, and so will appear at the output in advance of the main output signal. Similarly, as a result of polarisation drift, a component of the signal originally polarised parallel to the reference plane, that is to say the signal which was originally delayed in the transmitter, will appear in the receiver in the upper branch, that is to say the branch including the delay loop, and so will be further delayed. This component then appears in the output signal as a trailing side-peak following the main peak in the photon-count.

Figure 2A:
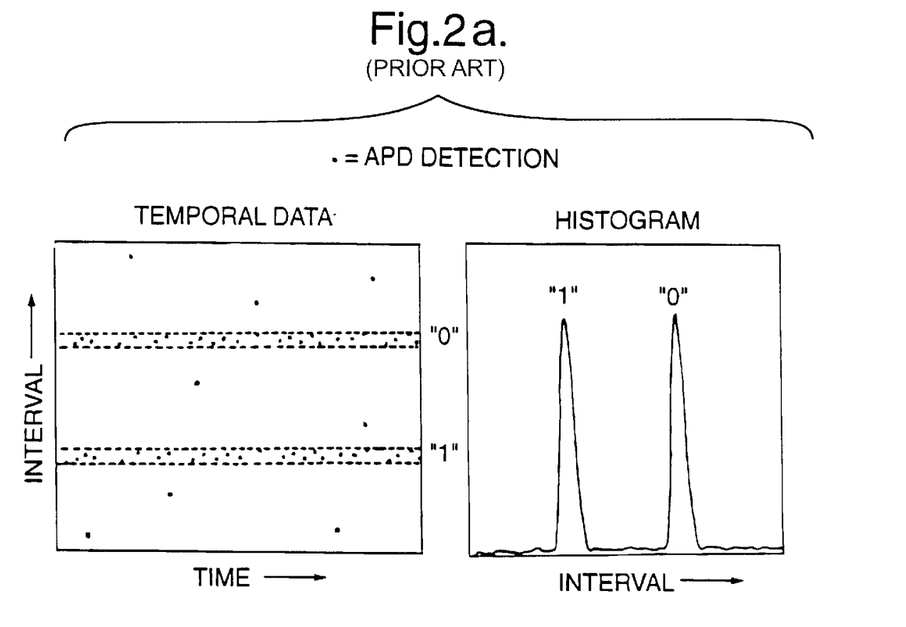
FIGS. 2a and 2b are graphs showing the output of the receiver in the system of FIG. 1.
Figure 2B:
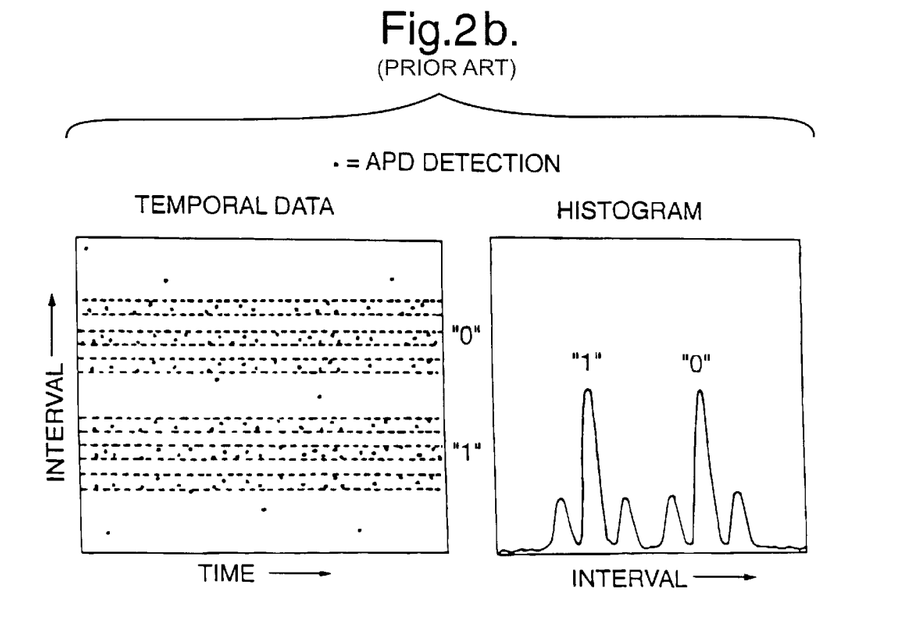

The effect of polarisation drift is illustrated in FIGS. 2a and 2b which show the output from the conventional system in both the ideal and non-ideal polarisation cases. The temporal data shows the detection events registered during the transmission of a random key sequence and the histograms show the average of one or many such transmissions. Each pulse generated by the APD starts a time interval measurement that is terminated by the first following clock pulse. As described in the applicant's copending international application WO 95/07582, the contents of which are incorporated herein by reference, prior to the transmission of signals on the quantum channel, a multi-photon synchronisation signal is communicated from the transmitter to the receiver. The system clock is in this way synchronised with the electrical pulse drive to the laser in the transmitter and hence photon detection events have well-defined intervals that lie in horizontal bands of width $\tau$, where $\tau$ is the APD response time. The delay loop in the final multiplexer stage of the system ensures that photons arriving from the '0' and '1' output ports of the interferometer generate different interval values and hence can be temporally discriminated. APD dark counts are not synchronised with the laser source and hence generate random interval values. Dark counts that fall outside the photocount bands are rejected, however the proportion that fall inside the bands generate errors in the key transmission. In the ideal polarisation case shown in the upper graph of FIG. 2a, all photons arriving at the receiver interfere and only two peaks are observed in the photocount histogram. In the non-ideal case, shown in the lower graph (FIG. 2b), many of the photons arrive in the non-interfering satellite peaks. The effect of polarisation drift is therefore to reduce the signal-to-noise ratio at the receiver by reducing the level of the main signal peaks and increasing the level of the side peaks. This can be a serious problem for a quantum cryptography system since the observed bit error rate is used as a measure of how much information has leaked to eavesdroppers. A high background error rate due to polarisation drift can limit the ability to detect eavesdroppers and hence compromise the security of the system. Moreover, the degradation in the signal at the receiver tends to vary randomly as the polarisation drift in the transmission link varies. Hence active polarisation control is required at the output of the transmission link as described in our above-cited copending international application.

Figure 3A:
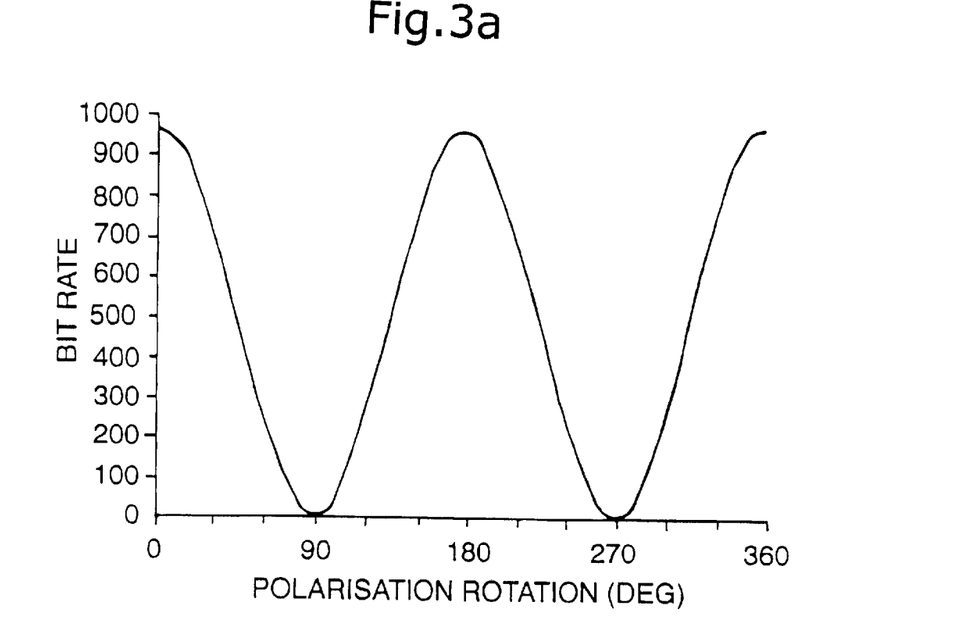
FIGS. 3a and 3b are graphs showing the relationship between polarisation rotation and bit rate and bit error rate (BER)
Figure 3B:
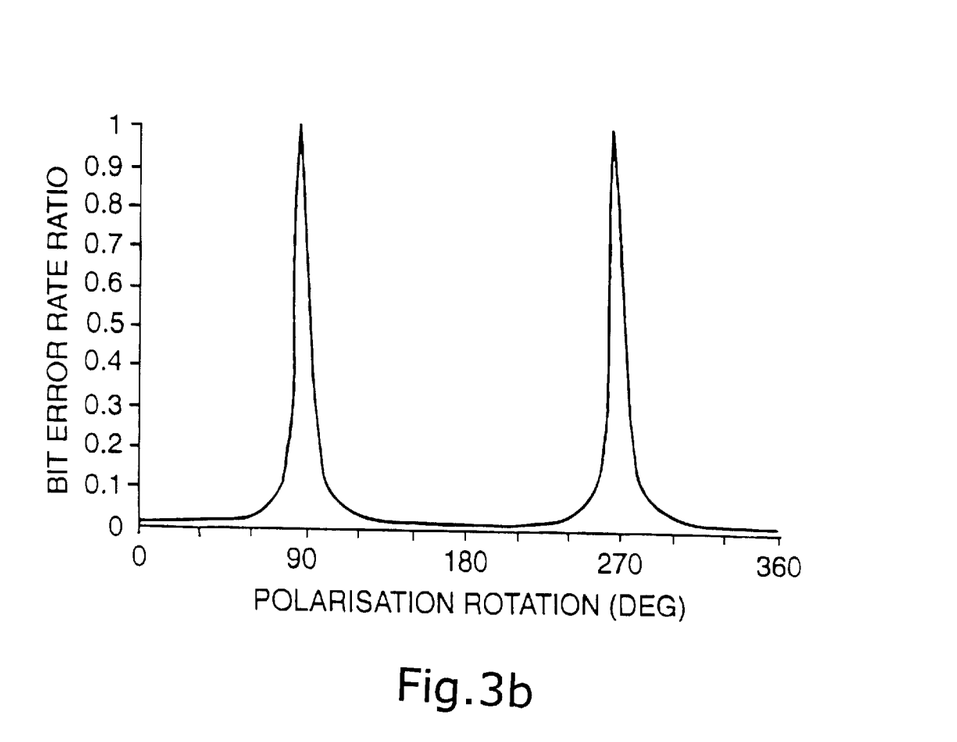

In order to calculate the effect of the polarisation drift we use the following expression for the bit error rate ratio BER in the system:

$$BER=(Df+(1/2)(1-V)PL\eta \cos^2\theta)/(Df+PL\eta \cos^2\theta)$$

where D is the number of counts per unit time due to detection noise, f is the fraction of those counts that fall within the photocount window, V($\approx$1) is the interference fringe visibility, P is the average number of photons per unit time leaving the transmitter, L is the system transmission coefficient due to loss in the fibre and optical components, and T is the detector quantum efficiency. The cosine term represents the magnitude of the pulse components falling within the main interference peak after polarisation drift parameterised by the angle $\theta$. The two terms in the numerator represent the error rate caused by detector noise and imperfect fringe visibility respectively, and the denominator represents the total count rate in the detection windows which is the received bit rate for the system. The results are shown in FIG. 3 for parameter values of $D=10^4 s^{-1}$, $f=5\times 10^{-4}$, $V=0.98$, $P=10^5 s^{-1}$, $L=0.08$ and $\eta=0.12$, which are representative of the experiment discussed by Marand and Townsend (Opt. Lett., 20, 1697 [1995]). As $\theta$ increases both the bit rate and the BER vary periodically. At the BER peaks the main photocount peaks shown in FIG. 2 will have disappeared, and all photons will be detected in the satellite peaks. Secure quantum key distribution can only be achieved with relatively low BER$\leq$0.1, for example. Hence, without active polarisation control, it is evident that the conventional system will exhibit large fluctuations in key transmission rate and will periodically become insecure.

Figure 4:
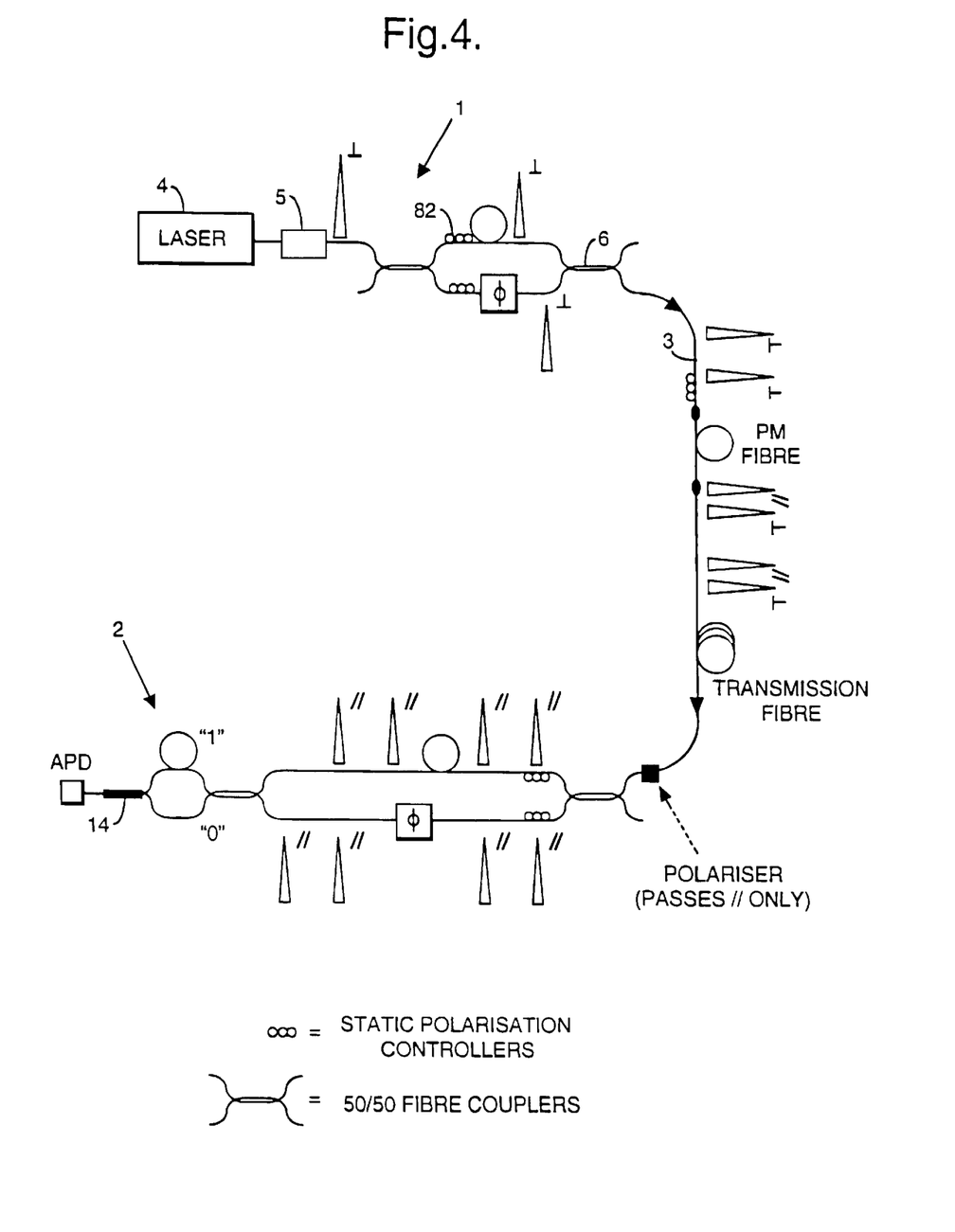
FIG. 4 is a diagram illustrating the use of polarisation maintaining fibre to produce duplicate single-photon pulses.
Figure 5:
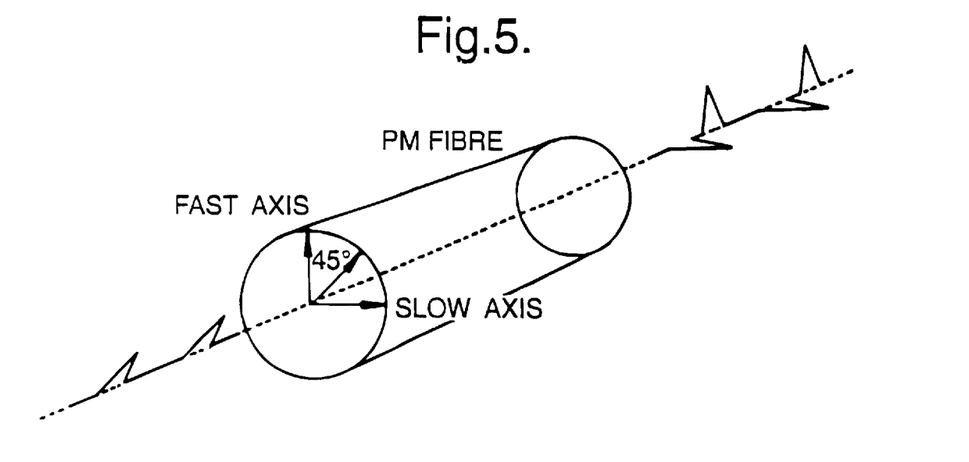
FIG. 5 is a schematic of a first example of a system embodying the present invention.

FIG. 4 illustrates a first example of a system embodying the present invention. By comparison with the conventional system, the transmitter is now modified in that the time-delayed pulse pair are now co-polarised and pass through a length of polarisation maintaining (PM) fibre before entering the transmission link. As shown in FIG. 5, the pulse pair are polarised at 45° to the fast and slow birefringent axes of the PM fibre and the different propagation speeds cause the orthogonal polarisation components of the pulses to separate in time. At 45° incidence, the two components are equal in magnitude, and so the overall effect on the error rate of any polarisation drift is substantially zero. At other angles of incidence, the two components differ in amplitude, and so the error rate shows some sensitivity to polarisation drift. As the angle moves away from 45° initially, in a system where the noise level is otherwise generally low, the effect is to reduce the effective bit rate. As the angle moves further away from 45°, then the error rate begins to increase sharply. This sensitivity increases until the angle of incidence is 0° or 90°, that is to say the plane of polarisation corresponds to one of the fast or slow axes of the fibre. Then, only a single component is transmitted, and so the sensitivity to polarisation drift is as great as that found in conventional systems. Preferably therefore, the angle between the axis of the fibre and the plane of polarisation of the input signal is 45° or, failing that, lies within the range from around 20° to 70°, and more preferably 35° to 55°. Preferably the secondary time delay $t_2$ is chosen to be less than the APD response time $t_d$ (typically 300–500 ps) but larger than the optical pulse width $\tau_p$-50 ps respectively. In most commercial PM fibre a delay of 150 ps could be obtained with ~150 m of fibre. The primary time delay $t_1$, will typically be in the range 500 ps–3 ns. Note that the polarisation reference plane indicated in FIG. 4 by the end of the // and ⊥ signs is rotated by 45° after the PM fibre.

Figure 6:
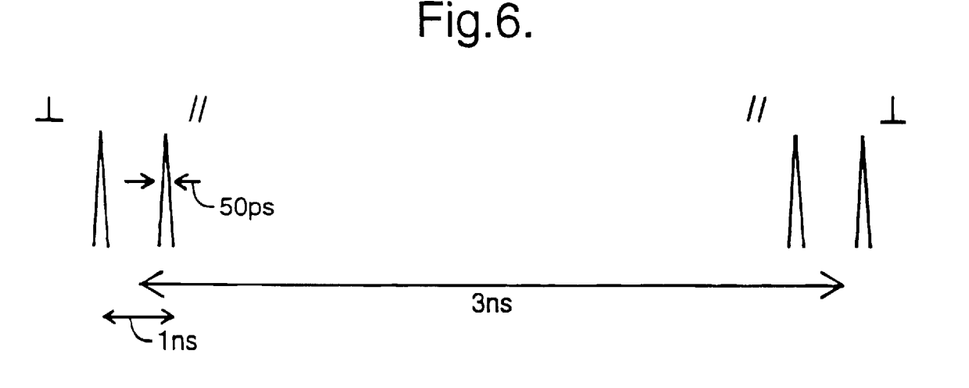
FIG. 6 is a plot showing the signals on the transmission link in the system of FIG. 5.

Using the configuration described in the immediately preceding paragraph, there is now transmitted for each signal output from one or other of the arms of the transmitter, a pair of identically phase-modulated pulses separated by a short delay and in orthogonal polarisation states. The overall pattern of pulses output by the transmitter is therefore as shown in FIG. 6.

At the receiver, no active polarisation control is now required. Instead the signals pass through a polariser and are then split between the two arms in the receiver by a 50/50 coupler. The photocount distribution for the system will appear similar to that illustrated in FIG. 2 for the non-ideal polarisation case in the conventional system. However, now the ratio of the main peak and satellite peak amplitudes is 2 for all output polarisation states from the transmission fibre. This can readily be seen by starting from the situation illustrated in FIG. 4 where one of the orthogonal pulse pairs (e.g. the leading pair) is completely blocked by the polariser at the input to the receiver. As the polarisation drifts the overall count rate stays constant, with the reduced contribution from the leading pulse pair compensated for by an increased contribution from the lagging pulse pair previously blocked by the polariser. Since the secondary delay between leading and lagging pairs $t_2$ is chosen to be less than the APD response time $\tau_d$ the overall shape of the photocount peaks does not change. By keeping $t_2 < \tau_d$ the photocount windows are maintained at their minimum values (i.e. $t_d$) and hence the signal-to-noise ratio is maximised. Note that in this system the key transmission rate and background error rate are now independent of any polarisation drift in the transmission fibre and hence no active polarisation control is required. The other polarisation controllers shown in FIG. 4 are static since the short lengths of fibre in the transmitter and receiver can in principle be isolated from any significant environmental perturbations. However, for more compact and stable configurations all the fibre in the transmitter and receiver could be replaced by polarisation-maintaining (PM) fibre or the whole structure could be fabricated from waveguides on a single planar silica chip (as discussed further below)

Figure 10:
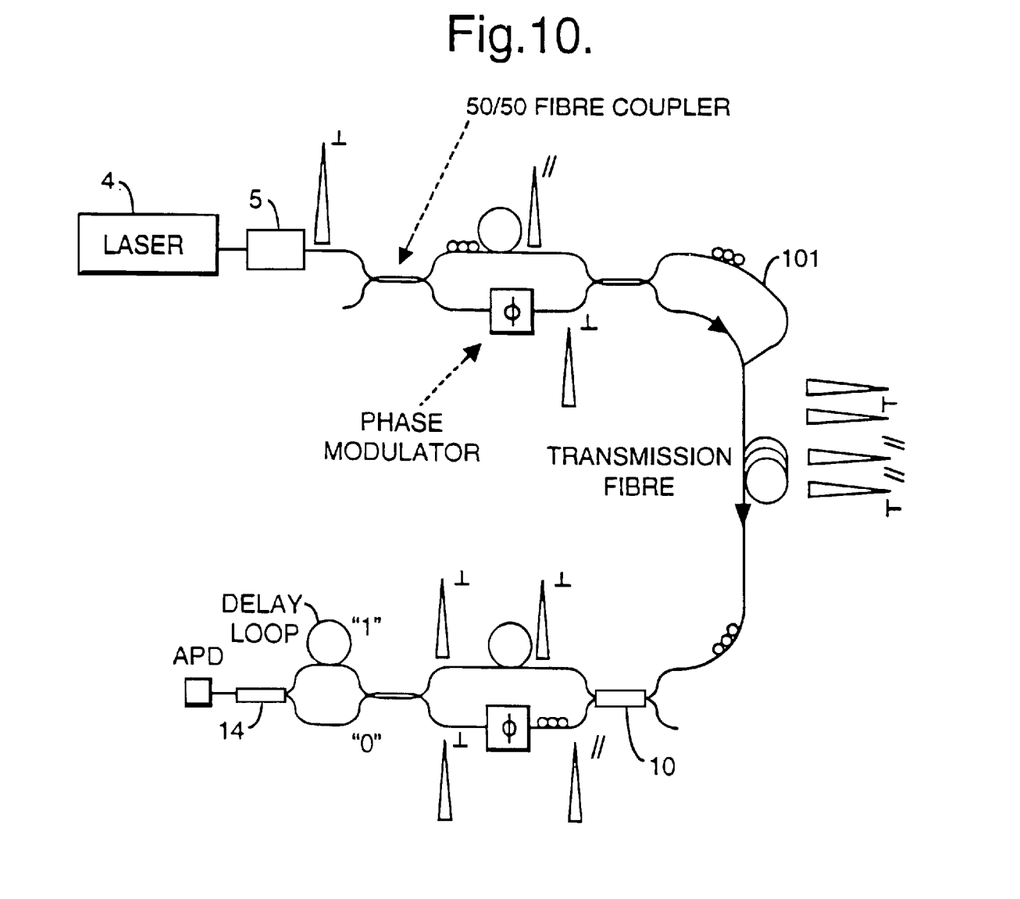
FIG. 10 is a schematic of a further example of a system embodying the present invention.

FIG. 10 illustrates another example of a system embodying the present invention. Instead of using PM fibre to duplicate the pulses, this embodiment takes a duplicate signal from the otherwise unused second output port of the 50/50 fibre coupler on the output side of the transmitter modulator section. The duplicate signal from the second output port is then passed through a branch 101 including a polarisation controller, which changes its polarisation state to be orthogonal to the original signal. The duplicate signal is then coupled back into the main signal path via a further 50/50 fibre coupler, with a short additional delay relative to the original signal. This additional delay provides the secondary delay $t_s$.

Figure 7:
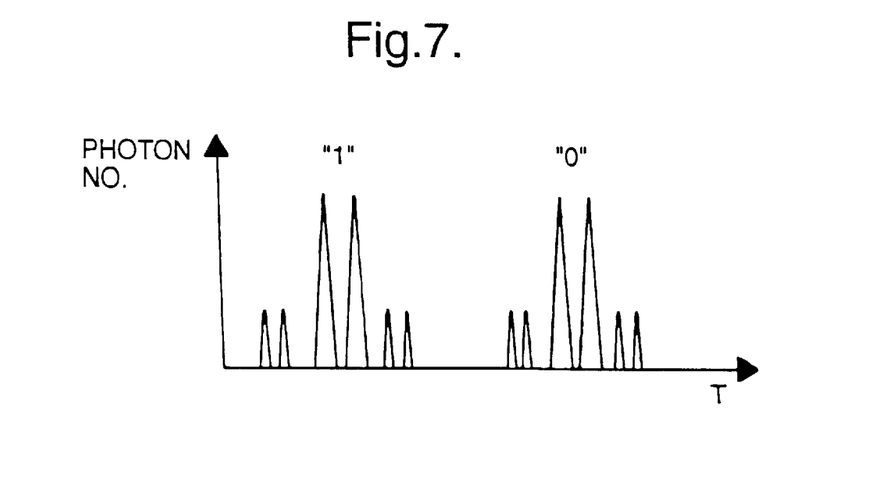
FIG. 7 is a graph showing the output of the receiver in the system of FIG. 5.

In implementing the system described above, it is necessary to take account of the relative phase shifts of the pulses in the different polarisation states as they pass through different transmission paths. Each 50/50 fibre coupler gives a relative phase shift of $\pi/2$ for the two outputs. By adding up the number of cross-couplings for the two orthogonally polarised signals, and multiplying by $\pi/2$, it is found that the pulses polarised parallel to the reference plane have a relative phase shift due to the couplers of $\pi$ while the orthogonally polarised pulses have a phase shift of 0. No further relative phase shift is introduced in the receiver. This means that when interference is constructive for the parallel-polarised pair it is destructive for the orthogonally polarised pair. Accordingly, as shown in FIG. 7, it is necessary to discriminate the two peaks due to the parallel and orthogonal pairs respectively, and to invert the key data carried by the parallel channel with respect to the data carried by the orthogonal channel.

Figure 8:
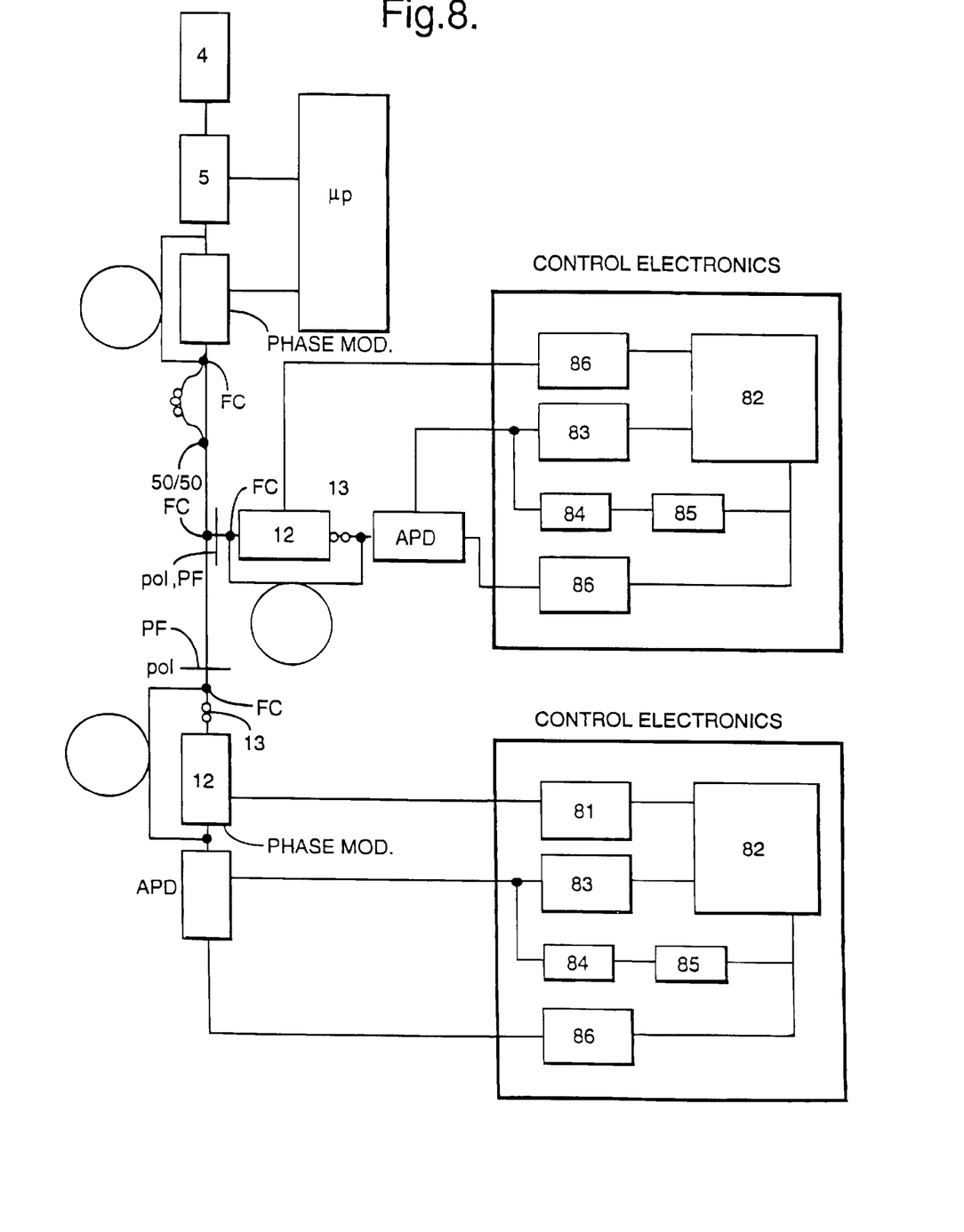
FIG. 8 is a schematic of a second example of a system embodying the present invention.

The technology used to implement the system may be generally similar to that described in our above-cited international application. In particular, the transmitter source may comprise a gain-switched semiconductor laser, which may be a DFB or Fabry Perot device and an attenuator. The single-photon detector in the receiver may be an avalanche photo diode (APD) biased beyond breakdown and operating in the Geiger mode with passive quenching, as discussed in PD Townsend et al, Electronics Letters 29, 634 (1993). Silicon APDs such as the SPCM-100-PQ (GE Canada Electro Optics) can be used in the 400–1060 nm wavelength range, while germanium or InGaAs devices such as the NDL 5102p or NDL5500p (NEC) can be used in the 1000–1550 nm range. As shown in FIG. 8 the receiver may also include a microprocessor control unit which receives the output of the APD via a discriminator/amplifier circuit, and where appropriate, inverts the bit values. The control unit may also include an electronic filter 84 and local oscillator 85 as well as an APD bias supply. The electronic filter is used to isolate the first harmonic of the frequency spectrum of a signal output by the APD in response to a synchronising pulse transmitted over the transmission link. This generates a sinusoidal signal at the pulse frequency which is used to lock the local oscillator. The output of the local oscillator is received at the control unit 82 to provide a timing reference for the quantum transmissions.

The phase modulators in the transmitter and receiver are lithium niobate or semiconductor phase modulators operating at, eg, 1–10 MHz. An appropriate lithium niobate device is available commercially as IOC PM1300.

A suitable polarisation controller for use in the transmitter and receiver, and, in the last of the above examples, for use in the branch used to generate the orthogonal pulses separated by the secondary delay interval, is that available commercially as BT&D/HP MCP1000. The 50/50 couplers are fused-fibre devices available commercially from SIFAM as model P22S13AA50.

Figure 11:
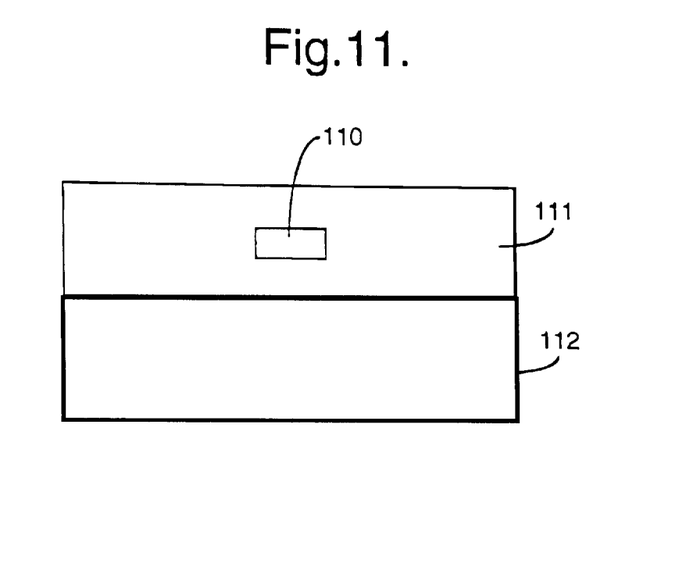
FIG. 11 is a cross section of a substrate for use in a planar silica implementation of the invention.

The transmitter and receiver structures may be fabricated using monolithic or hybrid integration techniques. This approach uses semi-conductor micro-fabrication techniques to combine all the required components onto a single compact device or chip. The stability of the devices will be also improved and the cost of manufacture potentially greatly reduced. The planar waveguide structures required to define the optical paths in the transmitter and receiver may be based on semiconductors e.g. Si or InGaAsP alloys, glass, LiNiO3, or some hybrid structure. FIG. 11 shows the cross-section of a silica glass waveguide fabricated on a silicon substrate, which would be a promising candidate for this application. The structure comprises an $SiO_2$ core 110, $SiO_2$ cladding 111 and the silicon substrate 112. In this structure the refractive indices of the SiO2 waveguide core and cladding regions are controlled by the inclusion of dopants such as, for example, P, Bo or Ge during deposition. Appropriate planar silica fabrication techniques and device structures are reviewed by M. Kawachi in Optical and Quantum Electronics, 22, 391 (1990) and by T. Miyashita et al in SPIE volume 993, Integrated Optical Engineering VI (1988).

Figure 12:
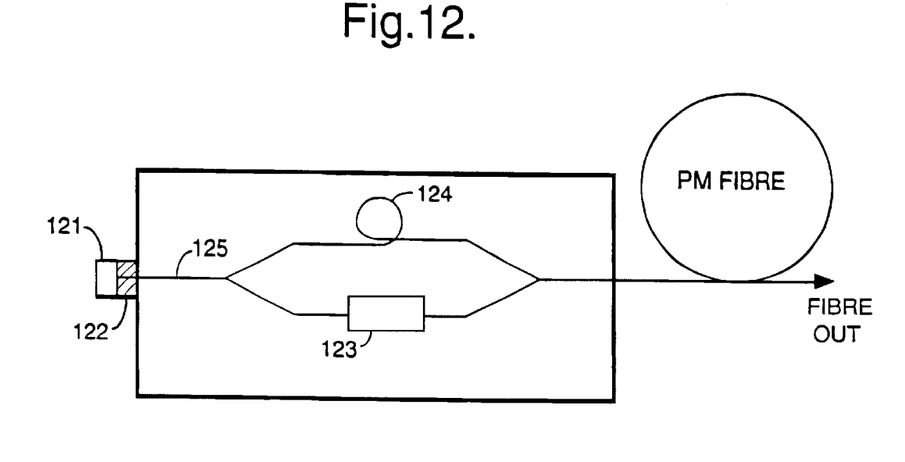
FIG. 12 is a first example of a transmitter using a planar silica structure.
Figure 13:
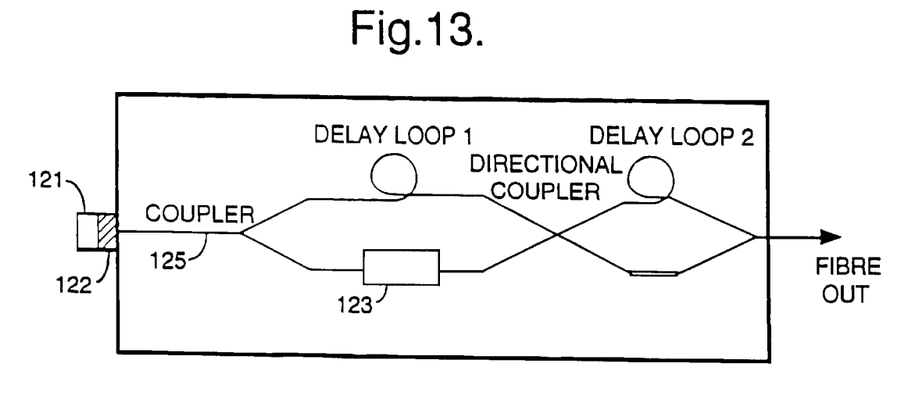
FIG. 13 is a second example of a transmitter using a planar silica structure.
Figure 14:
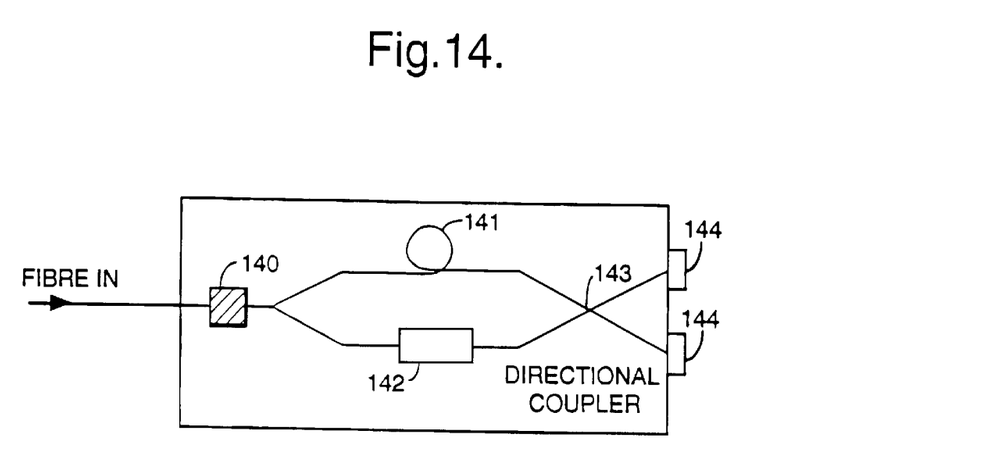
FIG. 14 is a transmitter using a planar silica structure.

Embodiments of the transmitter and receiver structures based on planar waveguide structures are illustrated in FIGS. 12, 13, 14. In the transmitters, the laser and absorption modulator may either be coupled directly to the waveguide structure, as shown, or remotely located and linked by a fibre. Alternatively, in a semiconductor-based structure these components may be fabricated directly into the planar chip. The absorption modulator, which may consist of one or more semiconductor electro-absorption devices, can be used as an external modulator for generating pulses from a cw laser source and also for controlling the average photon number of the pulses leaving the receiver (typically ~0.1). If the planar structures are fabricated using silica waveguides then the active phase modulators can utilise either the thermo-optic effect, or the electro-optic effect which can be made non-zero in glass by electric field poling (see e.g. X.-C. Long et al., Photonics Technology Letters, 8, 227 [1996]). In the former case the phase modulator drive electrode takes the form of a thin-film heater and the device is likely to have a maximum operating frequency of ~10 kHz, limited by the thermal conductivity of the waveguide and substrate materials. Poled devices, on the other hand, in which phase modulation is generated via an applied electric field offer the prospect of much higher operating frequencies >1 GHz. Alternatively, the waveguides may be fabricated from a semiconductor such as Si, and in this case the refractive index changes required for phase modulation may be generated by changing the carrier population in an electrically active device fabricated on or near one of waveguides. The transmitter shown in FIG. 12 uses an external length of PM fibre to separate the output pulses into two orthogonally polarised and time delayed channels as discussed above for the first fibre-based embodiment. In FIG. 12 the other components illustrated comprise a laser 121, absorption modulator 122 Y coupler 125, delay loop 124 and electrode 123. In the transmitter shown in FIG. 13, instead of using an external PM fibre, this function is carried out on the planar waveguide chip itself by means of an additional delay stage containing a polarisation mode converter 130 (TE/TM or TM/TE) in one arm. TE/TM mode conversion has been demonstrated in LiNiO$_3$ waveguide structures and polarisation modulators based on the effect are commercially available as model AOPC-1310/1550 from E-Tek Dynamics Inc. The receiver shown in FIG. 14 has a structure complementary to that of the transmitters apart from the inclusion of a polariser in the input waveguide. The polariser 140 can be fabricated as a metal film overlay that is sufficiently close to the waveguide core for coupling to a plasmon mode of the metal to occur. This coupling is highly polarisation selective such that one of the orthogonal modes is strongly attenuated. Polarisers based on this effect are currently commercially available from Sifam as model SP13/15. The APD detectors 144 can be mounted directly on the waveguide outputs of the interferometer as shown in FIG. 14 or alternatively an additional waveguide delay stage may be included on the chip such that a single APD may be used as in the fibre-based embodiment discussed above. The device of FIG. 14 also includes electrode 142, delay loop 141 and directional coupler 143.

Figure 15:
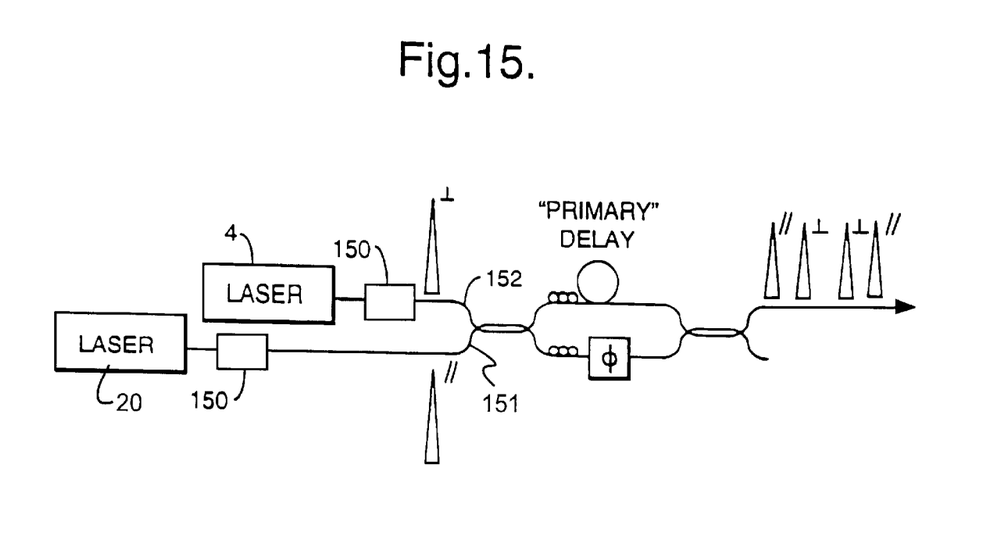
FIG. 15 is a diagram showing part of a system incorporating two single-photon sources.

As noted in the summary of the invention above, the invention may be implemented by a system using a pair of single-photons sources which may be incoherent. This arrangement is shown in FIG. 15. In this scheme, the secondary delay, that is the delay between the original and duplicate pulses, is set by the path length difference between the two sources. That is to say, the secondary delay is determined by the difference in length between a first input branch 152 connected to laser 4 and a second input branch 151 which is connected to laser 20. The phase modulator in one of the transmitter arms must be polarisation independent. Both of the input branches include attenuators 150. When such a transmitter structure is used, then the receiver may have the same layout as the conventional receiver shown in FIG. 1. It includes at its input a polarisation splitter, rather than a polariser filter preceding a 50/50 coupler as in others of the embodiments described above.

Although, for ease of illustration, the, examples described so far use a simple point-to-point link, the present invention is by no means limited to use in this manner, and in practice may often be used over multiple access networks such as those described in our above-cited co-pending international application. FIG. 8 shows one example of a network having a tree structure linking a transmitter to two receivers at different locations on the network. As discussed in our earlier application, the single-photon signals branch randomly on the network and this behaviour is used to establish different respective keys for the different receivers. A polarisation filter PF is used at the input to the or each receiver to resolve the two different polarisation components in a manner analogous to the operation of the polarisation splitter in the first example.

After the passing of single-photon signals between the transmitter and the or each receiver, the transmitter and receivers) enter a public discussion phase in which individual single-photon signals and their sent and received states are identified by means of the time-slot in which they were detected and transmitted. At the end of this process the transmitter and the or each receiver are in possession of a mutually secret key. Where there is more than one receiver on the network, then, except with a small probability which can be reduced arbitrarily close to zero by privacy amplification, each terminal has no knowledge of any other key apart from its own.

After this public discussion phase, the keys can be used to encrypt securely data transmission between the transmitter and the or each receiver.

The public discussion stage described above may be carried out over the same network, possibly using bright multi-photon signals, or over a separate and independent communication channel. Privacy amplification is a procedure described in the paper by C H Bennet et al "Experimental Quantum Cryptography", J. Cryptography, 5, 3 (1992). Privacy amplification ensures that the transmitter and receiver end up with identical keys, and the any key information leaked to an eavesdropper or to another terminal is an arbitrarily small fraction of one bit. The different stages outlined above can be summarised as follows:

(i) Transmitter (Alice) and receiver (Bob) perform raw transmission and discard bits from different bases.
(ii) Public comparison of randomly-selected sample and estimation of error rate.
(iii) Public error correction procedure producing error-corrected key.
(iv) Estimation of how much information eavesdropper (Eve) may have about the key.
(v) Privacy amplification to distil a final secret key about which Eve has negligible information.

Stage ii might optionally be omitted, since the error rate may also be determined in step iii. In the examples discussed above, the statistic used to determine the presence or absence of an eavesdropper may be simply the error rate as determined in stage ii and/or iii. This is then compared with a predetermined threshold level. However, other more complex statistics may be used. For example, as described in our copending application WO 96/06491, coincidence detection may be used. At its simplest, the statistical test may simply check that the count rate is not significantly lower than that expected.

Figure 9:
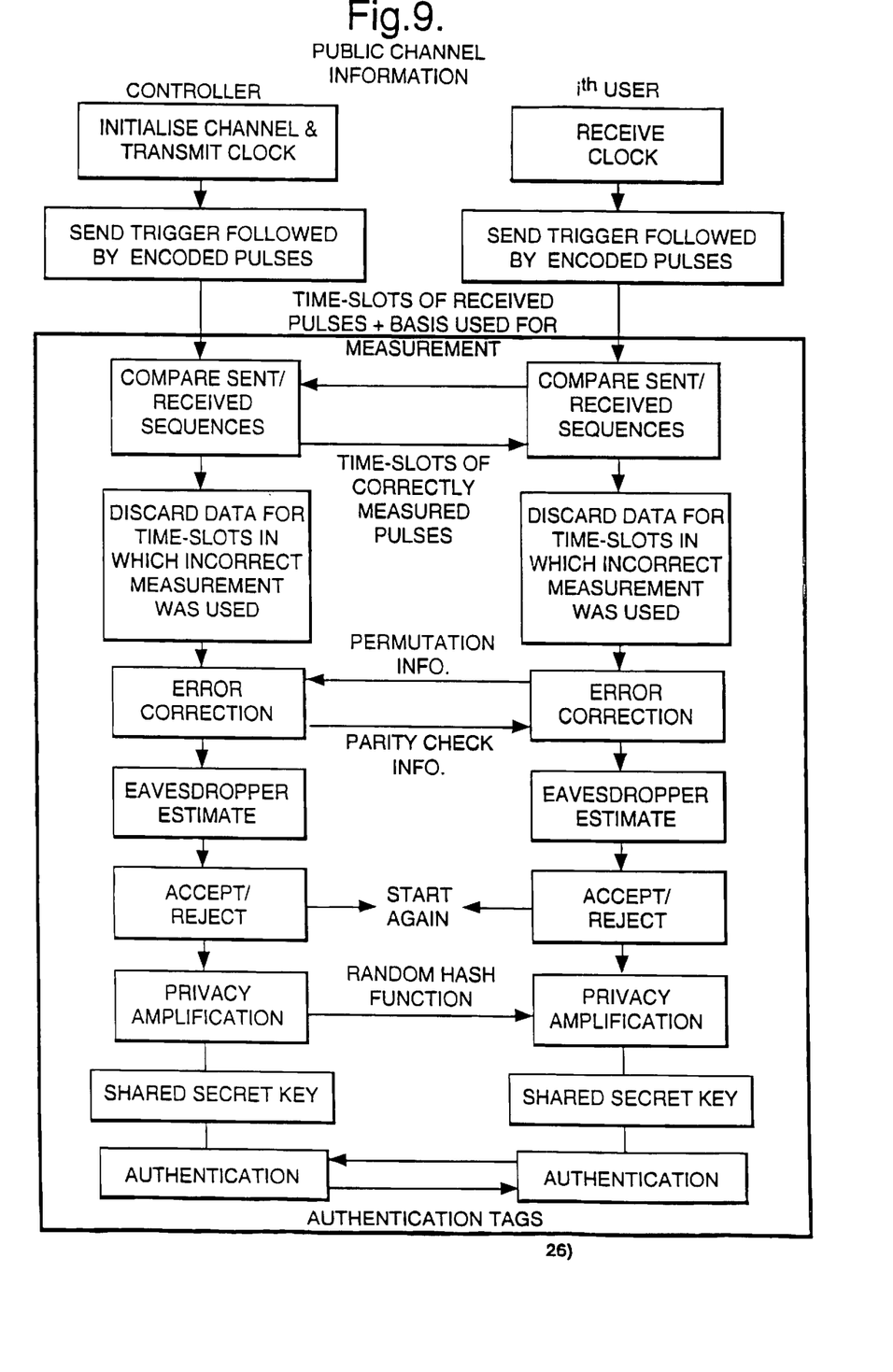
FIG. 9 is a flow diagram for a method of communication using quantum cryptography.

FIG. 9 is a flow diagram showing the above stages and the data flow between the transmitter (Alice) and the receiver (Bob).

What is claimed is:

1. A method of communication using quantum cryptography, said method comprising:
   a) phase-modulating a single-photon signal;
   b) transmitting the single-photon signal over a pair of time-multiplexed transmission paths;
   c) transmitting, with the original single-photon signal in each of the pair of time-multiplexed transmission paths, a duplicate single-photon signal, which duplicate single-photon signal is modulated identically to the respective original single-photon signal and is polarised orthogonally with respect to the respective original single-photon signal; and
   d) interferometrically combining outputs of the time-multiplexed paths including contributions from both the original and the duplicate single-photon signals, thereby making a polarisation-insensitive measurement.

2. A method as in claim 1, in which:
   the phase-modulated single-photon signals are output onto a multiple access network, and
   (d) is carried out for each of a plurality of users connected to the multiple access network.

3. A method of operating a transmitter in a communication system using quantum cryptography, the method comprising:
   a) phase-modulating a single-photon signal;
   b) transmitting the single-photon signal over a pair of time-multiplexed transmission paths; and
   c transmitting, with the original single-photon signal in each of the pair of time-multiplexed transmission paths, a duplicate single-photon signal, which duplicate single-photon signal is modulated identically to the respective original single-photon signal and is polarised orthogonally with respect to the respective original single-photon signal.

4. A method as in claim 1 including, subsequent to (a): splitting the single-photon signal into two orthogonally polarised components; and
   selectively delaying one of the two components, thereby providing separation in the time domain for the said original and duplicate single-photon signals.

5. A method as in claim 4, in which the splitting and selectively delaying are carried out by passing the single-photon signal through a length of polarisation maintaining fibre.

6. A method as in claim 4, in which the splitting and selectively delaying are carried out by passing the single-photon signal through an integrated waveguide structure, which integrated waveguide structure includes a TE/TM (transverse magnetic/transverse electric) or TM/TE mode converter.

7. A method as in claim 1, in which separation in the time domain of the original and duplicate signals is less than the response time of a single-photon detector used in making a polarisation-insensitive measurement.

8. A communications system using quantum cryptographic, said system comprising:
   a) a source of single-photon signals;
   b) a phase modulator for modulating the single-photon signals;
   c) a pair of time-multiplexed transmission paths connecting the output of the phase modulator to a receiver;
   d) means for transmitting with each original single photon signal in each respective time-multiplexed path a duplicate single photon signal which is separated in the time domain from the respective original single-photon signal, the duplicate single-photon signal being modulated identically to the original single photon signal and polarised orthogonally to the original single-photon signal; and
   e) a demodulation and detection stage arranged to interferometrically combine outputs of the time-multiplexed transmission paths including contributions from both the original and duplicate single-photon signals to make a single polarisation-insensitive measurement.

9. A system as in claim 8, including a multiple access network which connects the said source of single-photon signals to a plurality of receivers.

10. A system as in claim 8, in which:
    the demodulation and detection stage includes a single-photon detector, and
    the separation in the time domain of the original and duplicate single-photon signals is less than the response time of the single-photon detector.

11. A transmitter system for use in quantum cryptography, said transmitter comprising:
    a) a source of single-photon signals;
    b) a phase modulator for modulating the single-photon signals;
    c) a pair of time-multiplexed transmission paths which, in use, connect the output of the phase modulator to a receiver; and
    d) means for transmitting with each original single photon signal in each respective time-multiplexed path, a duplicate single photon signal which is separated in the time domain from the respective original single-photon signal, the duplicate single-photon signal being modulated identically to the original single photon signal and polarised orthogonally to the original single-photon signal.

12. A system as in claim 8, including a splitter/delay stage which is connected to the output of the phase modulator and is arranged to split the single-photon signal into two orthogonally polarised components and to delay one of the two components, thereby providing separation in the time domain for the original and duplicate single-photon signals.

13. A system as in claim 12, in which the splitter/delay stage comprises a length of polarisation maintaining fibre.

14. A system as in claim 13, in which the optical axis of the polarisation maintaining fibre is at an angle from 20° to 70° to the plane of polarisation of the single-photon signal at its input.

15. A system as in claim 14, in which the said angle is substantially 45°.

16. A system as in claim 8, in which the splitter/delay stage comprises an integrated waveguide structure including a TE/TM (transverse electric/transverse magnetic or TM/TE mode converter.

17. An optical communications network including a system as in claim 8.

18. A signal for use in a quantum cryptographic communication system, the signal comprising.

original and duplicate single photon signals which are separated from each other in the time domain, are identically modulated, and are mutually orthogonally polarised.

19. A method of communication using quantum cryptography including phase-modulating a single-photon signal and transmitting the single-photon signal over a pair of time-multiplexed transmission paths and subsequently demodulating and detecting the single-photon signal by combining interferometrically the outputs of the time-multiplexed paths, said method comprising:

transmitting, with each original single-photon signal in each respective time-multiplexed path, a duplicate single-photon signal separated in the time-domain from the respective original single-photon signal, the duplicate single-photon signal being modulated identically to the respective original single-photon signal and polarised orthogonally with respect to the original single-photon signal, and, said demodulating and detecting including combining contributions from both the original and the orthogonally polarised duplicate single-photon signals to make a single polarisation-insensitive measurement.

20. A communications system using quantum cryptography including a source of single-photon signals, a phase modulator for modulating the single-photon signals, a pair of time-multiplexed transmission paths connecting the output of the phase modulator to a receiver, and a phase demodulator and a detector (APD) for demodulating and detecting the single-photon signal at the receiver by combining interferometrically the outputs of the time-multiplexed paths, said system comprising:

means for outputting, with each original single-photon signal in each respective time-multiplexed path, a duplicate single-photon signal separated in the time-domain from the respective original single-photon signal, the duplicate single-photon signal being modulated identically to the respective original single-photon signal, and the receiver including means arranged to combine contributions from both the original and the orthogonally polarised duplicate single-photon signals to make a single polarisation-insensitive measurement.

21. A receiver for use in a quantum cryptographic communication system, the receiver comprising:

a) an optical input which, in use, is connected to a pair of time-multiplexed transmission paths carrying mutually orthogonally polarised original and duplicate single-photon signals which are identically modulated; and b) a demodulation and detection stage arranged to interferometrically combine outputs of the time-multiplexed transmission paths including contributions from both the original and duplicate single-photon signals to make a single polarisation-insensitive measurement.

22. A method of operating a receiver in a quantum cryptographic communication system, the method comprising:

a) receiving optical signals from a pair of time-multiplexed transmission paths, the optical signal from each of the pair of time-multiplexed transmission paths comprising original and duplicate single-photon signals which are separated in the time-domain, are identically modulated, and are mutually orthogonally polarised; and b) interferometrically combining outputs of the time-multiplexed paths including contributions from both the original and the duplicate single-photon signals, and making thereby a polarisation-insensitive measurement.

23. A system as in claim 11, including a splitter/delay stage which is connected to the output of the phase modulator and is arranged to split the single-photon signal into two orthogonally polarised components and to delay one of the two components, thereby providing separation in the time domain for the original and duplicate single-photon signals.

24. An optical communications network including a system as in claim 16.

* * * * *